A. M. SORBER.
CONVEYER CHAIN.
APPLICATION FILED APR. 7, 1914.
1,221,617.
Patented Apr. 3, 1917.
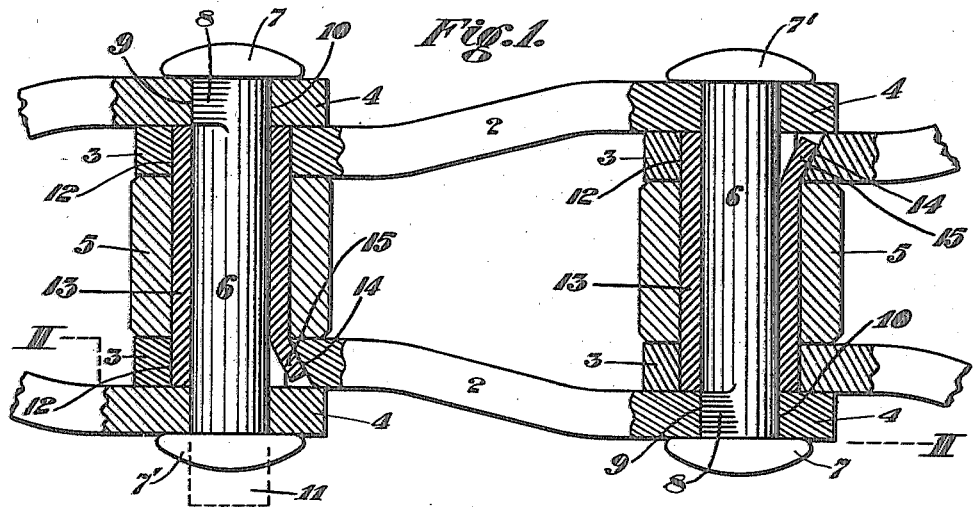
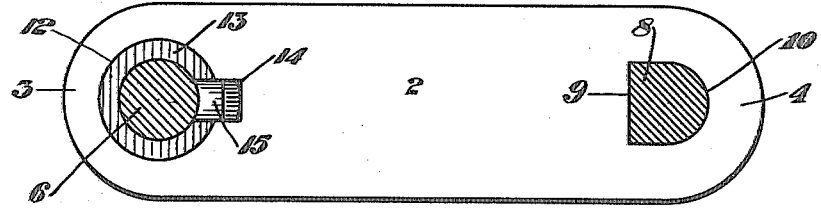
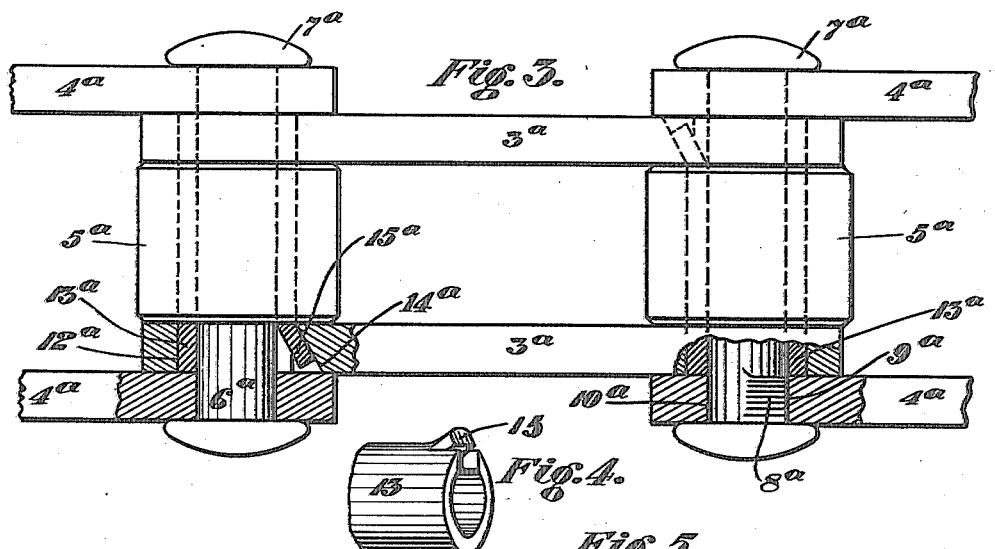
Witnesses:
Inventor:
Alexander M. Sorber

UNITED STATES PATENT OFFICE.

ALEXANDER M. SORBER, OF NEWELL, PENNSYLVANIA, ASSIGNOR TO PITTSBURGH COAL WASHER COMPANY, OF PITTSBURGH, PENNSYLVANIA, A CORPORATION OF PENNSYLVANIA.

CONVEYER-CHAIN.

1,221,617.  Specification of Letters Patent.  Patented Apr. 3, 1917.

Application filed April 7, 1914. Serial No. 830,146.

*To all whom it may concern:*

Be it known that I, ALEXANDER M. SORBER, a citizen of the United States, residing at Newell, in the county of Fayette and State of Pennsylvania, have invented certain new and useful Improvements in Conveyer-Chains, of which the following is a specification.

My invention consists of an improvement in conveyer chains or chains for any similar purpose, composed of series of connected links and provided with bearing or carrying rollers, and it has for its object to provide in a chain of such type for the pivotal connection of the links and the mounting of the pivotal stud, bushing and roller, as hereinafter more fully described.

Ordinarily, where the roller is merely mounted upon the pivotal pin, it rapidly wears and deteriorates, and where bushings have been employed, they have been subject to derangement and breakage, due to the ineffective means for continuously positioning them.

In my invention, I have provided for fixedly holding the connecting pivotal pin or bolt in the outer link terminals and the fixed positioning and holding of the surrounding bushing in the inner link terminals, whereby to insure relative positioning of the bolt and bushing and providing for rotatable mounting of the carrying roller between the terminals of the inner links upon such bushing.

Preferred forms of the invention are illustrated in the accompanying drawings, in which—

Figure 1 is a sectional plan view showing one arrangement of links and illustrating the construction.

Fig. 2 is a view in sectional elevation, indicated by the section line II. II. of Fig. 1.

Fig. 3 is a plan view showing a modified arrangement of links.

Fig. 4 is a detail view showing one end of the bushing.

Fig. 5 is a similar view showing one end of the pin.

In the construction as illustrated in Figs. 1 and 2, the links 2 have alternating inner and outer terminals 3 and 4 respectively of well-known construction. These links are of suitable size, shape and dimensions to suit the work in view, and are spaced apart in standard construction to provide ample space for the teeth of the driving sprocket mechanism and for the carrying rollers 5.

For the purpose of connecting the several pairs of links 2, I provide the usual pin 6 extending through the overlapping terminals of the links and preferably secured against longitudinal movement by any suitable means, as rivet heads 7, 7'.

One end of the pin 6 is squared, as indicated at 8, adjacent to its formed head 7, of a depth substantially equaling the thickness of the link, and the outer end of the link at one side is provided with a correspondingly squared cavity 9 extending inwardly toward the other end of the link, whereby to receive and fixedly hold the shank of the bolt against rotation.

The other side of the hole or eye of the link is semi-circular, as indicated at 10, of usual form. The remaining portion of the pin 6 is cylindrical, as usual, extending outwardly, as indicated in dotted lines at 11, whereby it may be swaged down to provide the rivet head 7', or provided with a cotter pin, or otherwise secured in position.

By this construction it will be seen that the pin 6 is fixedly held by its shoulder 8 by one of the outer link terminals, at each joint, so that it will be uniformly maintained in the same position with relation to said link portions.

The inner link terminals 3, which embrace the bolt 6, are provided with enlarged eyes or holes 12, for the reception of the roller-carrying bushing or thimble 13.

It is desirable that such bushing be also fixedly held in the inner terminals of the links, so that it will provide a stationary bushing mounting for the roller 5. For such purpose the inner portion of the hole 12 longitudinally of the link 2 is provided with a socket or recess 14, preferably squared or otherwise shaped, and one end of the bushing 13 is swaged outwardly, as indicated at 15, providing an interengaging lug.

Said lug interfits with recess 14 and effectually holds the bushing 13 against rotation.

The roller 5 when mounted on the bushing, as shown, between the inner ends 3 of the pair of links, is thus rotatable upon a relatively stationary bushing, while ample provision is made for free flexibility of the joint when passing around bends, the pin 6 turning with the links to which it is secured within the bushing 13.

In the construction shown in Fig. 3, the links are continuously straight, consisting of alternating pairs of inner links 3ª and outer links 4ª. In such case, the bushing 13ª is fixedly connected with one of the inner links 3ª by means of the deflected lug 15ª at one end, interfitting with a suitable receiving recess 14ª, while the bolt 6ª is provided at one end with a square or polygonal shoulder 8ª seated in a receiving recess 9ª of the outer link for the same purpose.

It will be observed that the construction and operation is substantially the same as above described, except that the links, being straight, the inner links only are provided with the lug-receiving recesses 14ª, and the outer links only are provided with the recesses 9ª.

The bolts and bushings may be arranged with regard to the endwise location of the shoulders 8 and lugs 15, as desired, either alternating or otherwise, as preferred, it being only necessary to hold the bolts and bushings at one end; in fact they being only capable of insertion when such features are at one end only.

The advantages of the construction will be readily appreciated by all those familiar with this class of mechanism.

I completely avoid the liability of derangement or unequal or unnecessary wear of the working parts. The construction is simple, efficient and economical, not liable to get out of order, worn parts may be readily replaced or substituted by the user, and the construction as a whole is well adapted to secure the objects in view.

Having described my invention, what I claim is:

In a chain joint of the class described, the combination of a pair of laterally spaced links having their terminals at one end spaced apart for clearance of a roller, each of said terminals having a circular bushing opening and the opening of one of said links having a lateral recess, a cylindrical bushing having a central bolt cavity fitting by its ends in said openings flush with the outer faces of the link terminals and having at one end a longitudinally slitted pressed out lug engaging said lateral recess, a link member having outer link terminals embracing said first named link terminals and provided with pin engaging holes registering with the bushing cavity, one of said outer link terminals having a lateral squared recess co-extensive with the diameter of the pin hole and both of said outer terminals confining said bushing against longitudinal movement, a central pin extending through said outer link terminals and the bushing and having terminal retaining heads and provided with a laterally squared shoulder engaging the squared recess of the outer link terminal, and a roller rotatably mounted on the bushing between the inner link terminals, substantially as set forth.

In testimony whereof I hereunto affix my signature in the presence of two witnesses.

ALEXANDER M. SORBER

Witnesses:
C. M. CLARKE,
FRED'K STAUB.